US010354522B2

(12) United States Patent
Nakagawa et al.

(10) Patent No.: US 10,354,522 B2
(45) Date of Patent: Jul. 16, 2019

(54) OPTICAL DETECTION DEVICE AND FACILITY MANAGEMENT SYSTEM

(71) Applicant: JTEKT CORPORATION, Osaka-shi (JP)

(72) Inventors: Tomoyuki Nakagawa, Gamagori (JP); Sakon Murayama, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/829,016

(22) Filed: Dec. 1, 2017

(65) Prior Publication Data
US 2018/0165955 A1 Jun. 14, 2018

(30) Foreign Application Priority Data

Dec. 8, 2016 (JP) .................. 2016-238343

(51) Int. Cl.
*H04B 10/80* (2013.01)
*G08G 1/07* (2006.01)
*G05B 19/05* (2006.01)
*G05B 19/418* (2006.01)
*G05B 19/042* (2006.01)

(52) U.S. Cl.
CPC .............. *G08G 1/07* (2013.01); *G05B 19/05* (2013.01); *G05B 19/418* (2013.01); *H04B 10/807* (2013.01); *G05B 19/042* (2013.01); *Y02P 90/02* (2015.11)

(58) Field of Classification Search
CPC ........................... H04B 10/116; H04B 10/807
See application file for complete search history.

(56) References Cited

U.S. PATENT DOCUMENTS

| 6,252,689 | B1 * | 6/2001 | Sharp | G08C 23/06 |
| | | | | 398/107 |
| 9,813,150 | B1 * | 11/2017 | Bitra | H04B 10/116 |
| 9,854,362 | B1 * | 12/2017 | Milne | H04B 10/116 |
| 2016/0308614 | A1 * | 10/2016 | Tsonev | H04B 10/116 |
| 2018/0131449 | A1 * | 5/2018 | Kare | G01S 17/026 |

FOREIGN PATENT DOCUMENTS

JP    2004-6291    1/2004

* cited by examiner

*Primary Examiner* — Nathan M Cors
(74) *Attorney, Agent, or Firm* — Oblon, McClelland, Maier & Neustadt L.L.P.

(57) ABSTRACT

An optical detection device includes: an optical sensor configured to detect light from a light source of an indication lamp; an optical-detection-side communication unit configured to wirelessly transmit at least an optical detection signal of the optical sensor; and a photoelectric conversion unit configured to convert light from the light source into power and to store the power. The optical sensor and the optical-detection-side communication unit operate using the power stored in the photoelectric conversion unit.

12 Claims, 6 Drawing Sheets

OPTICAL DETECTION DEVICE AND FACILITY MANAGEMENT SYSTEM

INCORPORATION BY REFERENCE

The disclosure of Japanese Patent Application No. 2016-238343 filed on Dec. 8, 2016 including the specification, drawings and abstract, is incorporated herein by reference in its entirety.

BACKGROUND OF THE INVENTION

1. Field of the Invention

The invention relates to an optical detection device that detects light and a facility management system that includes the optical detection device.

2. Description of the Related Art

When operation conditions of an existing facility can be transmitted from the existing facility to the outside, an operator or a manager can easily understand the operation conditions to achieve improvement in production efficiency. However, in order to transmit operation conditions of an existing facility to the outside, an existing control device such as software (a ladder circuit) of a controller (PLC) of the existing facility need to be changed or a new control device such as a relay component for inputting an input signal to the PLC need be added to an existing control panel. Accordingly, costs or the number of process steps increases.

Japanese Patent Application Publication No. 2004-006291 (JP 2004-006291 A) describes a device that is provided in a signal indication lamp disposed in an existing facility and can transmit operation conditions of the existing facility from the existing facility to the outside. That is, the device detects a signal from the signal indication lamp that emits light depending on the operation conditions of the existing facility and transmits the detected signal to the outside using a radio unit. According to this device, an existing control device need not to be changed and a new control device need not to be added to an existing control panel.

However, in the device described in JP 2004-006291 A, it is necessary to acquire a power source for operation from the existing facility, and thus, costs or the number of process steps increase due to addition of wires, breakers, or the like.

SUMMARY OF THE INVENTION

An object of the invention is to provide an optical detection device that includes a power source for operation and detects light and a facility management system that includes the optical detection device.

According to an aspect of the invention, there is provided an optical detection device including: an optical sensor configured to detect light from a light source of an indication lamp; an optical-detection-side communication unit configured to wirelessly transmit at least an optical detection signal of the optical sensor; and a photoelectric conversion unit configured to convert light from the light source into power and to store the power, wherein the optical sensor and the optical-detection-side communication unit operate using the power stored in the photoelectric conversion unit.

With the optical detection device according to the above aspect, the optical sensor and the optical-detection-side communication unit operate with power into which light from the light source of the indication lamp is converted and the optical-detection-side communication unit transmits an optical detection signal or the like in a wireless manner. Accordingly, since a wire for supply of power from an existing facility or a wire for communication with an external device is not necessary and the optical detection device can operate simply by arranging the optical detection device in the vicinity of the indication lamp, it is possible to prevent an increase in costs or the number of process steps. Since the photoelectric conversion unit converts light from the light source of the indication lamp into power, the optical detection device can operate even in an indoor place which solar light does not reach and a device independent of the surrounding environment can be constituted. Since the photoelectric conversion unit converts light from the indication lamp that is closer to the photoelectric conversion unit than indoor illumination, it is possible to enhance power conversion efficiency in comparison with light from indoor illumination.

According to another aspect of the invention, there is provided a facility management system including: the optical detection device according to the above-described aspect that is attached to a facility; and a facility managing device that includes a management-side communication unit receiving a signal transmitted from the optical-detection-side communication unit of the optical detection device attached to the facility and an information display unit displaying information of a signal received by the management-side communication unit and that manages the facility. According to this facility management system, since the operation conditions of the facility can be comprehensively managed by the facility managing device, it is possible to achieve improvement in an operation rate of the facility and reduction in a burden on an operator in addition to the advantages of the optical detection device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
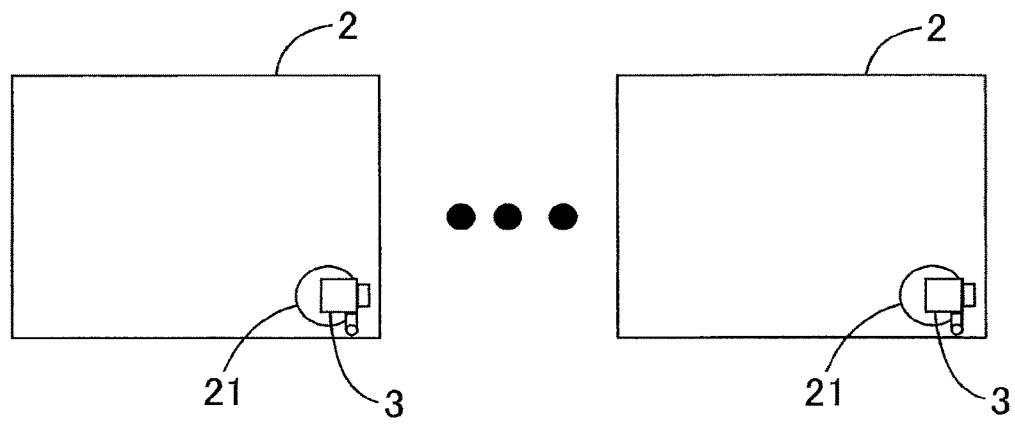
FIG. 1 is a diagram schematically illustrating a facility management system including an optical detection device according to an embodiment of the invention.
Figure 1:
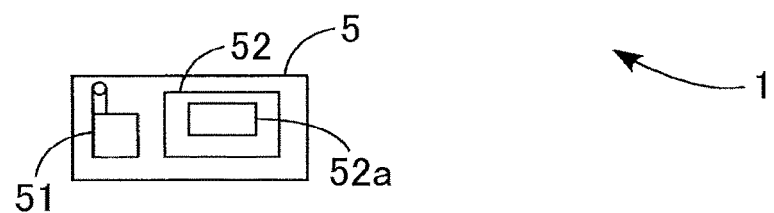

A facility management system including an optical detection device according to an embodiment of the invention will be described below with reference to the accompanying drawings. As illustrated in FIG. 1, the facility management system 1 includes a plurality of facilities 2, optical detection devices 3 each attached to a corresponding one of the facilities 2, and a facility managing device 5 that manages the facilities 2.

Figure 2:
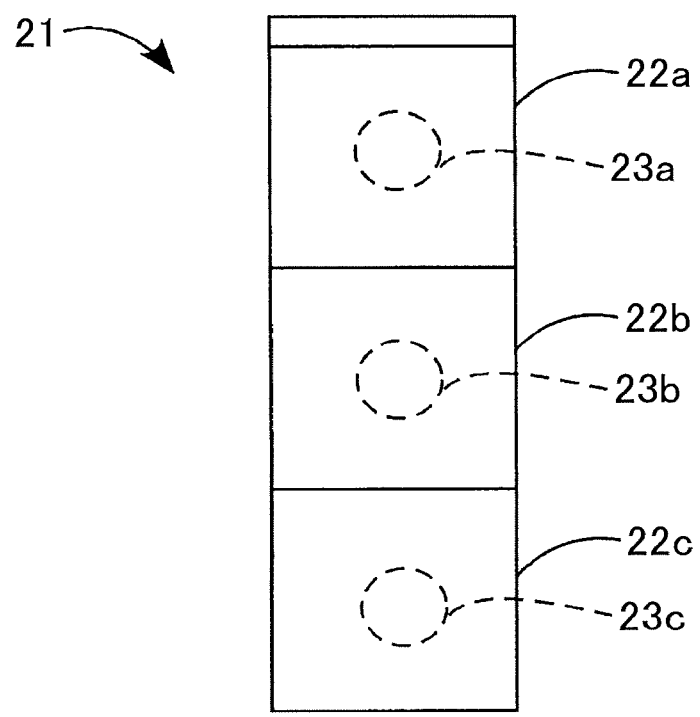
FIG. 2 is a diagram illustrating a signal indication lamp of a facility to which the optical detection device is applied.

Each facility 2 is, for example, a machining device that can cut or grind a workpiece. A signal indication lamp 21 that notifies operation conditions of each facility 2 by emitting light is disposed in an upper part of the facility 2. As illustrated in FIG. 2, the signal indication lamp 21 is typical and has a configuration in which translucent plastic cases 22a, 22b, and 22c of a hollow cylindrical shape are stacked in three stages and light sources 23a, 23b, and 23c such as LEDs are arranged in the plastic cases 22a, 22b, and 22c, respectively.

The plastic cases 22a, 22b, and 22c are colored, for example, in red, yellow, and green sequentially from the upper stages. The signal indication lamp 21 lights up red, yellow, and green based on emission of light from the light sources 23a, 23b, and 23c, respectively. For example, the signal indication lamp 21 indicates that the operation condition of the facility 2 is abnormal when it lights up red, indicates that the operation condition of the facility 2 requires maintenance when it lights up yellow, and indicates that the operation condition of the facility 2 is normal when it lights up green.

Figure 3A:
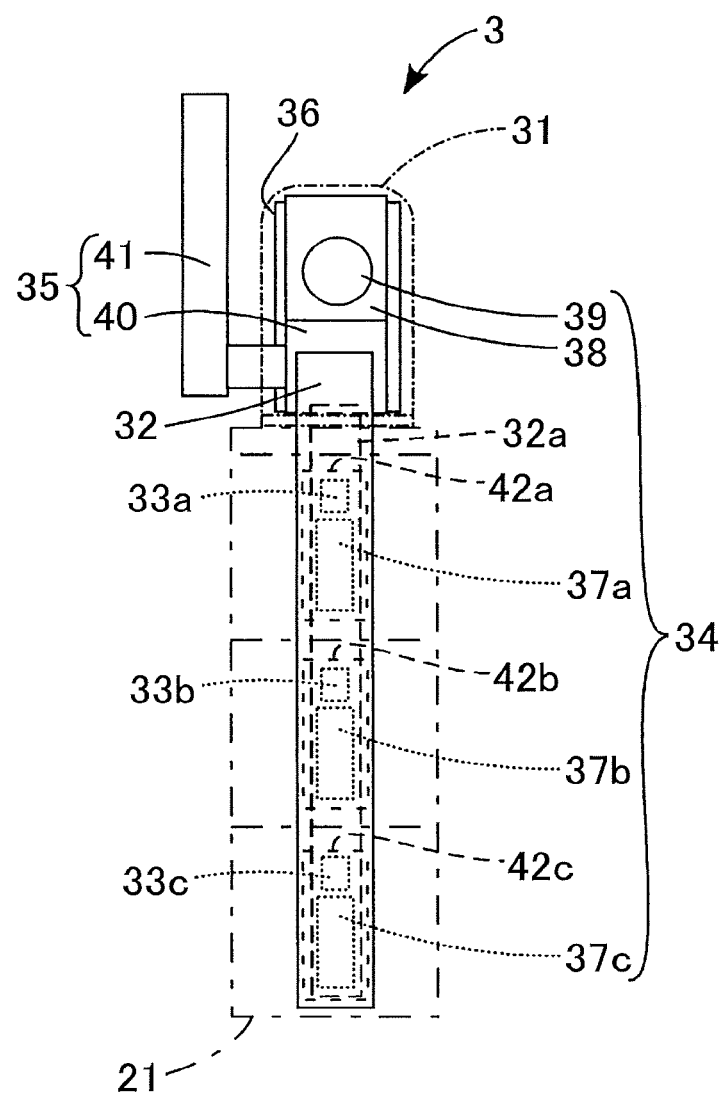
FIG. 3A is a diagram illustrating details of the optical detection device.
Figure 3B:
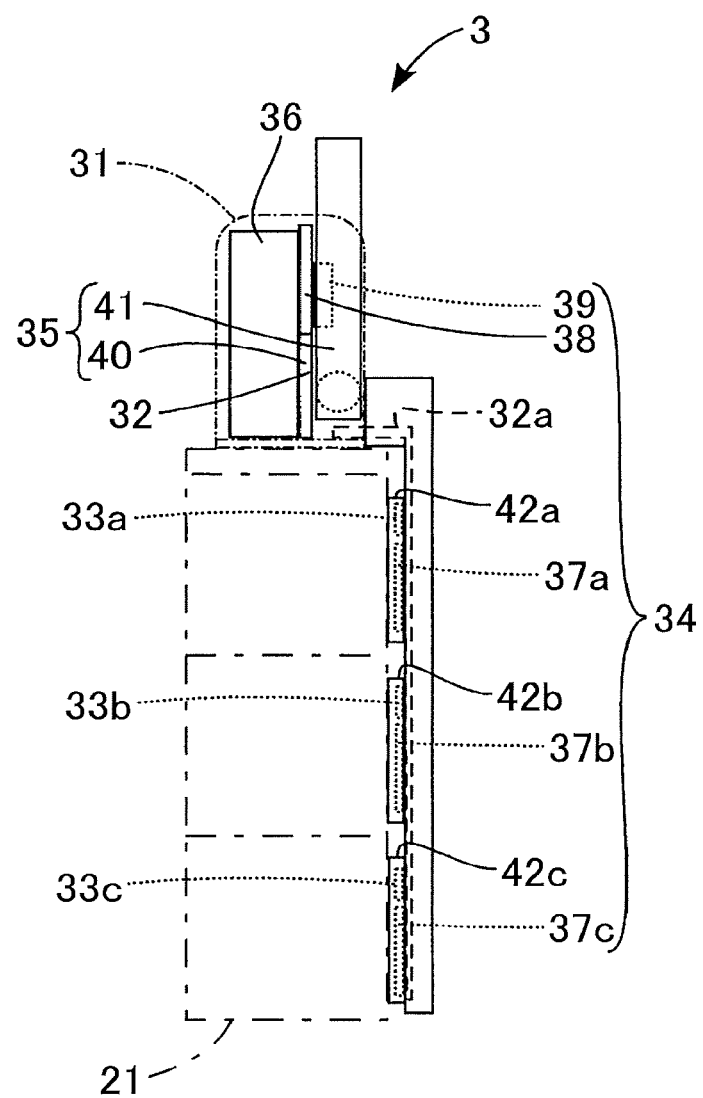
FIG. 3B is a view of the optical detection device of FIG. 3A with the optical detection device turned 90 degrees around a vertical axis of the signal indication lamp.

As illustrated in FIGS. 3A and 3B, the optical detection device 3 includes a case 31, an attachment member 32, three optical sensors 33a, 33b, and 33c, a photoelectric conversion unit 34, an optical-detection-side communication unit 35, and a complementary power source 36. The photoelectric conversion unit 34 includes three photovoltaic units 37a, 37b, and 37c, a power supply management module 38, and a capacitor 39. The optical-detection-side communication unit 35 includes a radio module 40 and an antenna 41.

The case 31 is formed in a hollow cylindrical shape and accommodates part of the photoelectric conversion unit 34 (the power supply management module 38 and the capacitor 39), part of the optical-detection-side communication unit 35, and the complementary power source 36. The case 31 is placed on the top surface of the signal indication lamp 21 and is fixed thereto if necessary. The case 31 is illustrated by an alternate single dot-dash line for the purpose of visualization of the inside.

The attachment member 32 is formed in a strip shape and an upper part of the attachment member 32 is secured to a circumferential surface of the case 31 such that the attachment member 32 hangs down from the circumferential surface of the case 31 along the circumferential surface of the signal indication lamp 21. A strip-shaped flexible circuit board 32a is disposed to extend along a surface of the attachment member 32 on the signal indication lamp 21 side from the inside of the case 31.

The optical sensor 33a and the photovoltaic unit 37a, the optical sensor 33b and the photovoltaic unit 37b, and the optical sensor 33c and the photovoltaic unit 37c are electrically connected to positions on the flexible circuit board 32a, which face the light sources 23a, 23b, and 23c of the signal indication lamp 21. The optical sensor 33a and the photovoltaic unit 37a, the optical sensor 33b and the photovoltaic unit 37b, and the optical sensor 33c and the photovoltaic unit 37c are covered with covers 42a, 42b, and 42c, respectively.

The covers 42a, 42b, and 42c and the plastic cases 22a, 22b, and 22c are closely bonded with rubber frames which are not illustrated. Accordingly, it is possible to prevent entrance of light or dust from the outside. When the optical sensors 33a, 33b, and 33c or the photovoltaic units 37a, 37b, and 37c emit a large amount of heat, it is possible to discharge heat inside the covers 42a, 42b, and 42c to the outside by forming gaps instead of providing the frames.

The optical sensors 33a, 33b, and 33c are photodiodes that detect a light flux (a quantity of light passing per unit time (lm (lumen)) or an illuminance (light flux incident on a unit area (1 m$^2$) (lx (lux)) from the light sources 23a, 23b, and 23c and output optical detection signals of, for example, 0 V to 2 V (which vary depending on the quantity of light or the intensity of a light flux). The optical sensors 33a, 33b, and 33c are electrically connected to the radio module 40 via the flexible circuit board 32a.

The photovoltaic units 37a, 37b, and 37c are, for example, solar cells of a crystalline silicon type that generate electric power using light from the light sources 23a, 23b, and 23c. The photovoltaic units 37a, 37b, and 37c are electrically connected to the power supply management module 38 via the flexible circuit board 32a. The power supply management module 38 manages power generation states of the photovoltaic units 37a, 37b, and 37c, an amount of stored power of the capacitor 39, and a state of charge of the complementary power source 36.

The capacitor 39 is electrically connected to the power supply management module 38 and stores power generated by the photovoltaic units 37a, 37b, and 37c. The electric power stored in the capacitor 39 is used for operation of the optical sensors 33a, 33b, and 33c and the radio module 40.

The radio module 40 wirelessly transmits optical detection signals (voltage signals or ON/OFF signals as calculation results of the voltages) of the optical sensors 33a, 33b, and 33c, IDs of the facilities 2, the amount of stored power of the capacitor 39, a state of charge of the complementary power source 36, a switching signal for switching from the capacitor 39 to the complementary power source 36, radio wave intensities, and the like. The antenna 41 is electrically connected to the radio module 40.

The complementary power source 36 is a disposable dry battery. In an initial stage in which electric power is not yet stored in the capacitor 39 or when the power storage capability of the capacitor 39 deteriorates, the capacitor 39 is switched to the complementary power source 36 such that electric power of the complementary power source 36 is used for operation of the optical sensors 33a, 33b, and 33c and the radio module 40. A rechargeable dry battery that can be charged with electric power generated by the photovoltaic units 37a, 37b, and 37c may be used as the complementary power source 36. Accordingly, it is possible to reduce an operator's burden in battery exchange work.

As illustrated in FIG. 1, the facility managing device 5 includes a management-side communication unit 51 and an information display unit 52. The management-side communication unit 51 receives a signal transmitted from the optical-detection-side communication unit 35 of the optical detection device 3. The information display unit 52 displays information of a signal received by the management-side communication unit 51 on a display unit 52a. Optical detection signals of the optical sensors 33a, 33b, and 33c, an ID of the facility 2, the amount of stored power of the capacitor 39, a state of charge of the complementary power source 36, a switching signal for switching from the capacitor 39 to the complementary power source 36, radio wave intensities, and the like are displayed on the display unit 52a. When the remaining power of the complementary power source 36 or the radio wave intensity decreases, a warning or the like is also displayed on the display unit 52a.

The facility managing device 5 may be configured to be carried by an operator or may be configured to be assembled into a host that comprehensively manages operations of the facilities 2. An operator can understand the operation conditions of the facility 2 based on lighting of the signal indication lamp 21 by viewing the indication on the display unit 52a of the information display unit 52.

Figure 4:
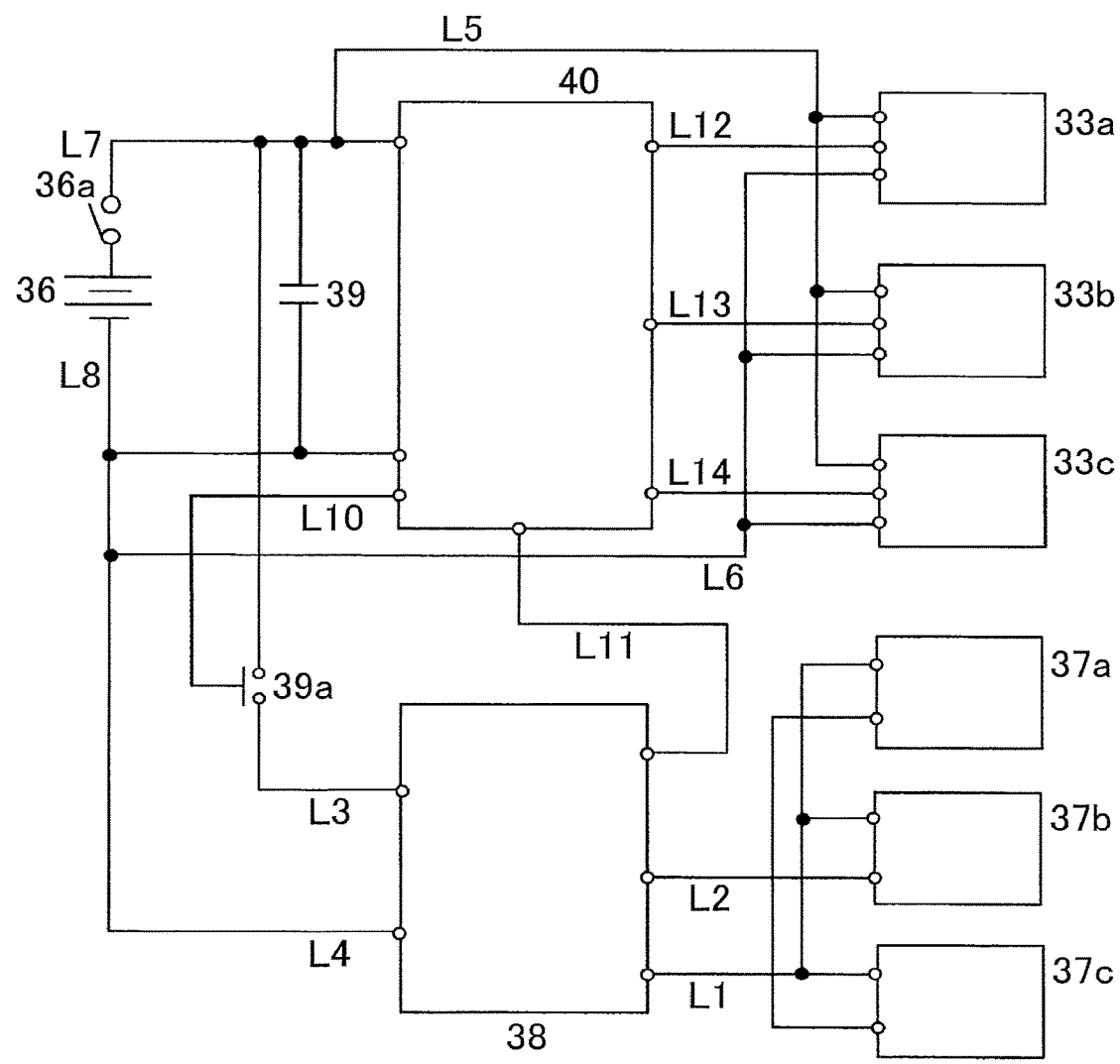
FIG. 4 is a diagram illustrating a circuit configuration of the optical detection device.

A circuit configuration and a circuit operation of the optical detection device 3 will be described below. As illustrated in FIG. 4, the three photovoltaic units 37a, 37b, and 37c are connected to the power supply management module 38 via power lines L1 and L2. The capacitor 39 is connected to the power supply management module 38 via power lines L3 and L4 and a switch 39a which can be automatically switched between ON and OFF. The switch 39a is connected to the radio module 40 via a signal line L10. The three optical sensors 33a, 33b, and 33c and the radio module 40 are connected to the capacitor 39 via power lines L5 and L6.

The three optical sensors 33a, 33b, and 33c and the radio module 40 are connected to the complementary power source 36 via power lines L7 and L8 and a switch 36a which can be manually switched between ON and OFF. The power supply management module 38 is connected to the radio module 40 via a signal line L11, and the three optical sensors 33a, 33b, and 33c are connected to the radio module 40 via signal lines L12, L13, and L14.

The photovoltaic units 37a, 37b, and 37c input generated electric power to the power supply management module 38 via the power lines L1 and L2. When receiving electric power input from the photovoltaic units 37a, 37b, and 37c, the power supply management module 38 stores the input electric power in the capacitor 39 via the power lines L3 and L4, and inputs a power input signal to the radio module 40 via the signal line L11. When receiving the power input signal input from the power supply management module 38, the radio module 40 outputs a switch-ON signal to the switch 39a via the signal line L10 to turn on the switch 39a.

When receiving electric power input from the capacitor 39 and detecting light from the light sources 23a, 23b, and 23c, the optical sensors 33a, 33b, and 33c input the optical detection signals to the radio module 40 via the signal lines L12, L13, and L14. When receiving electric power input from the capacitor 39 and the power input signal input from the power supply management module 38, the radio module 40 wirelessly transmits the optical detection signals to the management-side communication unit 51 of the facility managing device 5.

Threshold values for the optical detection signals input from the optical sensors 33a, 33b, and 33c are stored in advance in the radio module 40. Light fluxes or illuminances of light from the light sources 23a, 23b, and 23c have values which vary depending on the facilities 2 or due to aging of the light sources 23a, 23b, and 23c. Accordingly, when the detection signals from the optical sensors 33a, 33b, and 33c exceed the threshold values, it can be recognized that the light is from the light sources 23a, 23b, and 23c.

The operation of the optical detection device 3 will be described below with reference to the drawings. Here, the optical detection device 3 in which the switch 36a is in an OFF state and the complementary power source 36 is in a non-connected state is assumed to be set on the signal indication lamp 21 of the facility 2. The radio module 40 determines whether an optical detection signal has been acquired from the optical sensors 33a, 33b, and 33c via the signal lines L12, L13, L14 (Step S1 in FIG. 5).

Figure 5:
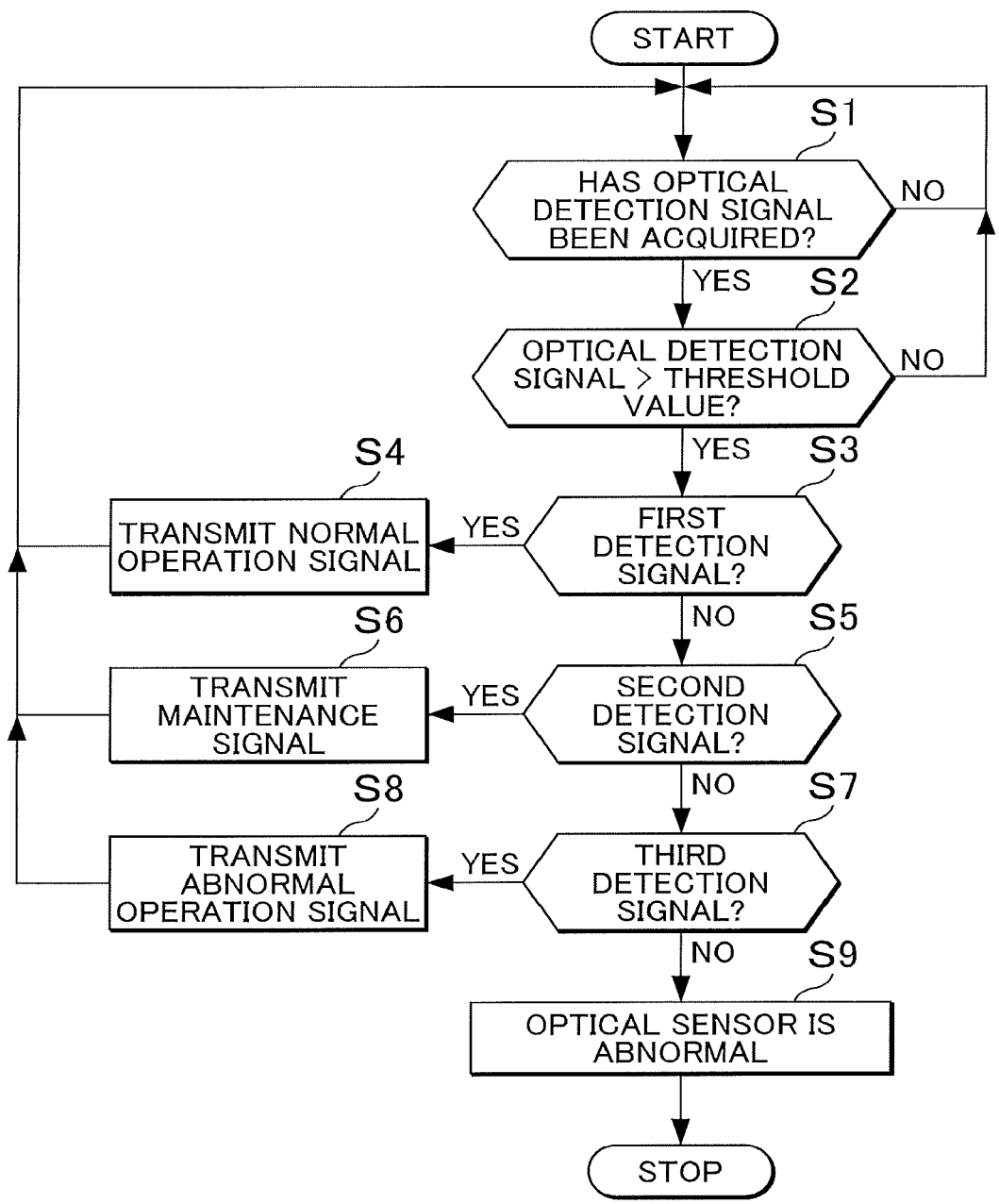
FIG. 5 is a flowchart illustrating the operation of the optical detection device.

Upon determination that an optical detection signal has been acquired, the radio module 40 determines whether the acquired optical detection signal exceeds the threshold value (Step S2 in FIG. 5). When it is determined that the acquired optical detection signal does not exceed the threshold value, the radio module 40 determines that light from the light sources 23a, 23b, and 23c has not been detected and repeatedly performs the above-mentioned processes from Step S1.

On the other hand, when it is determined that the acquired optical detection signal exceeds the threshold value, the radio module 40 determines whether the acquired optical detection signal is a detection signal (a first detection signal) acquired from the optical sensor 33a via the signal line L12 (Step S3 in FIG. 5). When it is determined that the acquired optical detection signal is the detection signal (the first detection signal) acquired from the optical sensor 33a via the signal line L12, the detected light is light from the light source 23a, and thus the radio module 40 wirelessly transmits a signal indicating that the facility 2 is operating normally to the management-side communication unit 51 of the facility managing device 5 (Step S4 in FIG. 5) and repeatedly performs the above-mentioned processes from Step S1.

The information display unit 52 of the facility managing device 5 displays a message indicating that the facility 2 is operating normally on the display unit 52a based on a normal operation signal received by the management-side communication unit 51. Accordingly, an operator can recognize that the facility 2 is operating normally.

On the other hand, when it is determined in Step S3 that the acquired optical detection signal is not the first detection signal, the radio module 40 determines whether the acquired optical detection signal is a detection signal (a second detection signal) acquired from the optical sensor 33b via the signal line L13 (Step S5 in FIG. 5). When it is determined that the acquired optical detection signal is the detection signal (the second detection signal) acquired from the optical sensor 33b via the signal line L13, the detected light is light from the light source 23b, and thus the radio module 40 wirelessly transmits a signal indicating that the facility 2 requires maintenance to the management-side communication unit 51 (Step S6 in FIG. 5) and repeatedly performs the above-mentioned processes from Step S1.

The information display unit 52 displays a message indicating that the facility 2 requires maintenance on the display unit 52a based on a maintenance signal received by the management-side communication unit 51. Accordingly, an operator can recognize that the facility 2 requires maintenance and thus moves to that facility 2 to perform appropriate maintenance.

On the other hand, when it is determined in Step S5 that the acquired optical detection signal is not the second detection signal, the radio module 40 determines whether the acquired optical detection signal is a detection signal (a third detection signal) acquired from the optical sensor 33c via the signal line L14 (Step S7 in FIG. 5). When it is determined that the acquired optical detection signal is the third detection signal, the detected light is light from the light source 23c, and thus the radio module 40 wirelessly transmits a signal indicating that the facility 2 is operating abnormally to the management-side communication unit 51 (Step S8 in FIG. 5) and repeatedly performs the above-mentioned processes from Step S1.

The information display unit 52 displays a message indicating that the facility 2 is operating abnormally on the display unit 52a based on an abnormal operation signal received by the management-side communication unit 51. Accordingly, an operator can recognize that the facility 2 is operating abnormally and thus moves to the relevant facility 2 to perform an appropriate restoration process.

On the other hand, when it is determined in Step S7 that the acquired optical detection signal is not the third detection signal, the radio module 40 determines that the optical sensors 33a, 33b, and 33c are abnormal, wirelessly transmits a signal indicating that to the management-side communication unit 51 (S9 in FIG. 5), and ends the processes.

The information display unit 52 displays a message indicating that the optical sensors 33a, 33b, and 33c are abnormal on the display unit 52a based on an abnormality signal received by the management-side communication unit 51. Accordingly, an operator can recognize that the optical sensors 33a, 33b, and 33c are abnormal, and thus moves to the relevant facility 2 to perform an appropriate restoration process.

In the above-mentioned embodiment, the optical-detection-side communication unit 35 has a transmitter function and the management-side communication unit 51 has a receiver function, but both the optical-detection-side communication unit 35 and the management-side communication unit 51 may have transmitter and receiver functions. The management-side communication unit 51 wirelessly transmits, to the optical-detection-side communication unit 35, a setting signal for operation of the optical detection device 3, e.g., a setting signal for the threshold values when it is intended to change the threshold values of the optical detection signals input from the optical sensors 33a, 33b, and 33c.

Accordingly, even when light fluxes or illuminances of light from the light sources 23a, 23b, and 23c vary due to aging of the light sources 23a, 23b, and 23c, an operator need not to move to the relevant facility 2 to change the threshold values. Thus, it is possible to reduce the number of process steps.

In the above-mentioned embodiment, the optical sensors 33a, 33b, and 33c detect light fluxes or illuminances of light from the light sources 23a, 23b, and 23c, but may detect red light, yellow light, and green light transmitted by the plastic cases 22a, 22b, and 22c. The optical sensors 33a, 33b, and 33c output the optical detection signals of 0 V to 2 V, but may be in an OFF state when light is not detected and switched to an ON state when light is detected.

When receiving a power input signal input from the power supply management module 38 of the photoelectric conversion unit 34, the radio module 40 of the optical-detection-side communication unit 35 wirelessly transmits an optical detection signal to the management-side communication unit 51 of the facility managing device 5, but the radio module 40 may be configured to wirelessly transmit an optical detection signal to the management-side communication unit 51 of the facility managing device 5 at predetermined time intervals regardless of whether the power input signal is input. Accordingly, an operator need not to move to the relevant facility 2 to check an operation state of the optical-detection-side communication unit 35. Thus, it is possible to reduce the number of process steps. The signal indication lamp 21 to which the optical detection device 3 can be applied is not limited to light sources of three colors, and may be light sources of any number of colors or a single light source of which an emission color varies.

The optical detection device 3 according to this embodiment includes: the optical sensors 33a, 33b, and 33c that detect light from the light sources 23a, 23b, and 23c of the indication lamp 21; the optical-detection-side communication unit 35 that wirelessly transmits at least optical detection signals of the optical sensors 33a, 33b, and 33c; and the photoelectric conversion unit 34 that converts light from the light sources 23a, 23b, and 23c into power and stores the converted power, and the optical sensors 33a, 33b, and 33c and the optical-detection-side communication unit 35 operate using the power stored in the photoelectric conversion unit 34.

According to this configuration, the optical sensors 33a, 33b, and 33c and the optical-detection-side communication unit 35 operate with power into which light from the light sources 23a, 23b, and 23c of the indication lamp 21 is converted and the optical-detection-side communication unit 35 transmits optical detection signals or the like in a wireless manner. Accordingly, wires for supply of power from the existing facility 2 or wires for communication with an external device are not necessary and the optical detection device can operate simply by arranging the optical detection device in the vicinity of the indication lamp 21. Thus, it is possible to prevent an increase in costs or the number of process steps. Since the photoelectric conversion unit 34 converts light from the light sources 23a, 23b, and 23c of the indication lamp 21 into power, the optical detection device 3 can operate even in an indoor place which solar light does not reach and thus a device independent of the surrounding environment can be constituted. Since the photoelectric conversion unit 34 converts light from the indication lamp 21 that is closer to the photoelectric conversion unit 34 than indoor illumination, it is possible to enhance power conversion efficiency in comparison with light from indoor illumination.

The optical-detection-side communication unit 35 operates when the optical sensors 33a, 33b, and 33c detect light from the light sources 23a, 23b, and 23c. Accordingly, it is possible to save power and to satisfactorily transmit the operation conditions of the facility. The optical-detection-side communication unit 35 stores threshold values for the optical detection signals of the optical sensors 33a, 33b, and 33c in advance and operates when the optical detection signals exceed the threshold values. Accordingly, it is possible to cope with the case where the value of light flux or illuminance of light from the light sources 23a, 23b, and 23c varies depending on the facilities 2 or due to aging of the light sources 23a, 23b, and 23c.

Since the optical-detection-side communication unit 35 operates at predetermined time intervals, it is not necessary for an operator to move to the relevant facility 2 to check an operation state of the optical-detection-side communication unit 35. Thus, it is possible to reduce the number of process steps. Since the optical detection device 3 further includes the complementary power source 36 that can supply power for operating the optical sensors 33a, 33b, and 33c and the optical-detection-side communication unit 35 instead of the photoelectric conversion unit 34, it is possible to satisfactorily cope with an initial stage in which power is not yet stored in the photoelectric conversion unit 34 or a case in which a power storage capability of the photoelectric conversion unit 34 deteriorates due to aging or the like.

When a rechargeable battery that can be charged with the power converted by the photoelectric conversion unit 34 is used for the complementary power source 36, it is possible to reduce an operator's burden in battery exchange work. Since the optical-detection-side communication unit 35 wirelessly transmits a switching signal for switching the photoelectric conversion unit 34 to the complementary power source 36, an operator can recognize abnormality of the photoelectric conversion unit 34 at a remote position away from the facilities 2.

The optical detection device 3 further includes the attachment member 32 on which at least the optical sensors 33a, 33b, and 33c, the optical-detection-side communication unit 35, and the photoelectric conversion unit 34 are mounted and that can be attached to the light sources 23a, 23b, and 23c, and the optical-detection-side communication unit 35 is disposed in an upper part of the attachment member 32. Accordingly, it is possible to secure a good radio wave state and to satisfactorily perform transmission. Since the attachment member 32 includes the covers 42a, 42b, and 42c that cover the optical sensors 33a, 33b, and 33c, it is possible to prevent entrance of light or dust from the outside.

Since the covers 42a, 42b, and 42c cover the photoelectric conversion unit 34, it is possible to prevent entrance of dust from the outside. Since the indication lamp 21 indicates the state of the workpiece machining device, an operator can understand the operation conditions of the machining device at a remote position other than the vicinity of the machining device.

The facility management system 1 according to this embodiment includes: the optical detection device 3 that is attached to the indication lamp 21 for indicating a state of a facility 2; and the facility managing device 5 that includes the management-side communication unit 51 receiving a signal transmitted from the optical-detection-side communication unit 35 of the optical detection device 3 attached to the indication lamp 21 and the information display unit 52 displaying information of a signal received by the management-side communication unit 51 and that manages the facility 2. According to this facility management system 1, the operation conditions of the facilities 2 can be comprehensively managed by the facility managing device 5. Thus, it is possible to achieve improvement in operation rate of the facilities 2 and reduction in a burden on an operator in addition to the advantages of the optical detection device 3 described above.

The optical-detection-side communication unit 35 and the management-side communication unit 51 have transmitter and receiver functions, and the optical detection device 3 operates based on the setting signal for operation of the optical detection device 3 which is transmitted from the management-side communication unit 51 and is received by the optical-detection-side communication unit 35. Accordingly, it is not necessary for an operator to move to the facility 2 to set the optical detection device 3, and it is thus possible to reduce the number of process steps.

What is claimed is:

1. An optical detection device comprising:
a first optical sensor configured to detect light from a first light source of an indication lamp;
a second optical sensor configured to detect light from a second light source of the indication lamp;
an optical-detection-side communication unit configured to wirelessly transmit at least an optical detection signal of the optical sensor;
a photoelectric conversion unit configured to convert light from the light sources into power and to store the power; and
an attachment member on which at least the first optical sensor, the second optical sensor, the optical-detection-side communication unit, and the photoelectric conversion unit are mounted, wherein
the optical sensor and the optical-detection-side communication unit operate using the power stored in the photoelectric conversion unit, and
the optical-detection-side communication unit wirelessly transmits a signal of a first status condition when the first optical sensor detects the light from the first light source and wirelessly transmits a signal of a second status condition when the second optical sensor detects the light from the second light source.

2. The optical detection device according to claim 1, wherein
the optical-detection-side communication unit operates when at least one of the first optical sensor and the second optical sensor detects light.

3. The optical detection device according to claim 1, wherein
the optical-detection-side communication unit stores a threshold value for the optical detection signal of the first optical sensor in advance and operates when the optical detection signal exceeds the threshold value.

4. The optical detection device according to claim 1, wherein
the optical-detection-side communication unit operates at predetermined time intervals.

5. The optical detection device according to claim 1, further comprising:
a complementary power source configured to supply power for operating the first optical sensor, the second optical sensor, and the optical-detection-side communication unit in place of the photoelectric conversion unit.

6. The optical detection device according to claim 5, wherein
the complementary power source is a rechargeable battery configured to be charged with the power converted by the photoelectric conversion unit.

7. The optical detection device according to claim 5, wherein
the optical-detection-side communication unit wirelessly transmits a switching signal for switching from the photoelectric conversion unit to the complementary power source.

8. An optical detection device comprising:
an optical sensor configured to detect light from a light source of an indication lamp;
an optical-detection-side communication unit configured to wirelessly transmit at least an optical detection signal of the optical sensor;
a photoelectric conversion unit configured to convert light from the light source into power and to store the power; and
an attachment member on which at least the optical sensor, the optical-detection-side communication unit, and the photoelectric conversion unit are mounted and that is configured to be attached to the light source, wherein
the optical sensor and the optical-detection-side communication unit operate using the power stored in the photoelectric conversion unit, and
the optical-detection-side communication unit is disposed in an upper part of the attachment member.

9. The optical detection device according to claim 8, wherein
the attachment member includes a cover that covers the optical sensor.

10. The optical detection device according to claim 9, wherein
the cover covers the photoelectric conversion unit.

11. A facility management system comprising:
an optical detection device attached to an indication lamp for indicating a state of a facility, the optical detection device including
an optical sensor configured to detect light from a light source of the indication lamp;

an optical-detection-side communication unit configured to wirelessly transmit at least an optical detection signal of the optical sensor; and a photoelectric conversion unit configured to convert light from the light source into power and to store the power, wherein the optical sensor and the optical-detection-side communication unit operate using the power stored in the photoelectric conversion unit; and a facility managing device that includes a management-side communication unit receiving a signal transmitted from the optical-detection-side communication unit of the optical detection device attached to the indication lamp and an information display unit displaying information of a signal received by the management-side communication unit and that manages the facility.

12. The facility management system according to claim 11, wherein the optical-detection-side communication unit and the management-side communication unit have transmitter and receiver functions, and the optical detection device operates based on a setting signal for operation of the optical detection device which is transmitted from the management-side communication unit and is received by the optical-detection-side communication unit.

\* \* \* \* \*